US008438007B1

(12) United States Patent
Hokari et al.

(10) Patent No.: US 8,438,007 B1
(45) Date of Patent: May 7, 2013

(54) SOFTWARE USER INTERFACE HUMAN LANGUAGE TRANSLATION

(75) Inventors: Masayuki Hokari, San Jose, CA (US); Claudia Galvan, San Jose, CA (US); Hervé Amblard, Santa Cruz, CA (US)

(73) Assignee: Adobe Systems Incorporated, San Jose, CA (US)

( * ) Notice: Subject to any disclaimer, the term of this patent is extended or adjusted under 35 U.S.C. 154(b) by 2678 days.

(21) Appl. No.: 09/823,911

(22) Filed: Mar. 30, 2001

(51) Int. Cl.
*G10L 17/28* (2006.01)

(52) U.S. Cl.
USPC ............................ 704/8; 704/2; 704/3; 704/7

(58) Field of Classification Search ................. 704/1–2, 704/8–10, 3, 7; 717/136
See application file for complete search history.

(56) References Cited

U.S. PATENT DOCUMENTS

| | | | | | |
|---|---|---|---|---|---|
| 4,566,078 A | * | 1/1986 | Crabtree | ............................ | 704/8 |
| 5,295,068 A | * | 3/1994 | Nishino et al. | ................... | 704/10 |
| 5,323,311 A | * | 6/1994 | Fukao et al. | ....................... | 704/8 |
| 5,416,903 A | * | 5/1995 | Malcolm | ............................ | 704/8 |
| 5,579,223 A | * | 11/1996 | Raman | .............................. | 704/1 |
| 5,583,761 A | * | 12/1996 | Chou | ................................. | 704/2 |
| 5,664,206 A | * | 9/1997 | Murow et al. | ...................... | 704/8 |
| 5,678,039 A | * | 10/1997 | Hinks et al. | ........................ | 707/4 |
| 5,724,593 A | * | 3/1998 | Hargrave et al. | ................... | 704/7 |
| 5,805,888 A | * | 9/1998 | Sasaki et al. | ....................... | 704/8 |
| 5,850,561 A | * | 12/1998 | Church et al. | ................. | 715/532 |
| 5,974,372 A | * | 10/1999 | Barnes et al. | ...................... | 704/8 |
| 6,006,221 A | * | 12/1999 | Liddy et al. | ............................ | 1/1 |
| 6,092,036 A | * | 7/2000 | Hamann | ............................ | 704/8 |
| 6,219,632 B1 | * | 4/2001 | Schumacher et al. | ............ | 704/8 |
| 6,278,969 B1 | * | 8/2001 | King et al. | ........................ | 704/7 |
| 6,334,101 B1 | * | 12/2001 | Hetherington et al. | ........... | 704/8 |
| 6,339,755 B1 | * | 1/2002 | Hetherington et al. | ........... | 704/8 |
| 6,345,244 B1 | * | 2/2002 | Clark | .................................. | 704/7 |
| 6,496,793 B1 | * | 12/2002 | Veditz et al. | ....................... | 704/8 |
| 6,735,759 B1 | * | 5/2004 | Yamamoto et al. | ............... | 704/8 |

* cited by examiner

*Primary Examiner* — James Wozniak
(74) *Attorney, Agent, or Firm* — Wolfe-SBMC (57) ABSTRACT

Systems, methods and computer program products for use in creating a glossary database including user interface string sets extracted from at least one product and their corresponding set identifiers, wherein a set identifier contains context information about a previous use of a user interface string, and for generating a second human language user interface for a product having a first human language user interface, using the glossary database. Creating a glossary database includes extracting a plurality of user interface strings from at least one product, creating a set identifier for each user interface string, and grouping user interface strings having the same set identifier into string sets.

40 Claims, 4 Drawing Sheets

SOFTWARE USER INTERFACE HUMAN LANGUAGE TRANSLATION

BACKGROUND OF INVENTION

This invention relates to translating user interfaces for software products from one human language to another.

The user interface is a key component of many software products. The user interface provides a convenient and friendly way for users to interact with the software product. A user interface is commonly developed to use a single language, such as English, when interacting with a user. A significant aspect of adapting a software product for sale in other countries is the translation of the user interface to the language of that country. This process is often referred to as "localization."

In general, localization includes activities such as resizing user interface elements, customizing features, and translating the strings presented to the user by the interface from one human language to another. For example, where the user interface of the English-language product presents the string "New Layer Set," the user interface of the corresponding French-language product might present "Nouveau Groupe de Calques."

Converting all of the strings in the user interface of a product from one language to another can be an expensive and time-consuming manual task.

SUMMARY

In general, in one aspect, the invention features a system, method and computer program product for use in generating a user interface for a second human language of a product having a user interface for a first human language. It includes generating a common glossary database by extracting a plurality of user interface strings from at least one product having a user interface for at least a first human language and a second human language; creating a set identifier for each user interface string, wherein a set identifier for a user interface string comprises context information about a previous use of the user interface string; and grouping user interface strings having the same set identifier into string sets. It further includes selecting a user interface string in the first human language user interface; finding a string set in the common glossary database having the selected user interface string and a user interface string in the second human language, wherein the user interface strings in the string set were previously used in a product different from the product for which the second human language user interface is being generated; and using the user interface string in the second human language in the second human language user interface. Particular implementations can include one or more of the following features.

One implementation excludes from the common glossary file those user interface strings that do not meet certain criteria. For example, excluding user interface strings not of a specified type or exceeding a specified maximum number of words.

One implementation includes exporting, from the common glossary database, the user interface strings to a dictionary database for human review; and updating the user interface strings in the common glossary database using the reviewed dictionary database.

Advantages that can be seen in implementations of the invention include one or more of the following. Implementations of the invention permit standardization of terminology and re-use in one product of translations from other products. Rapid and accurate translations are possible at low cost. The probability of human error in translating is reduced. Rapid localization of products allows simultaneous release of the domestic and foreign versions of a product. The process is independent of framework and version. The process can also be used to create different editions of a product in a single language. For example, different terms may be used in the business and home editions of a product.

The details of one or more embodiments of the invention are set forth in the accompanying drawings and the description below. Other features and advantages of the invention will become apparent from the description, the drawings, and the claims.

DESCRIPTION OF DRAWINGS

Like reference symbols in the various drawings indicate like elements.

DETAILED DESCRIPTION

Figure 1:
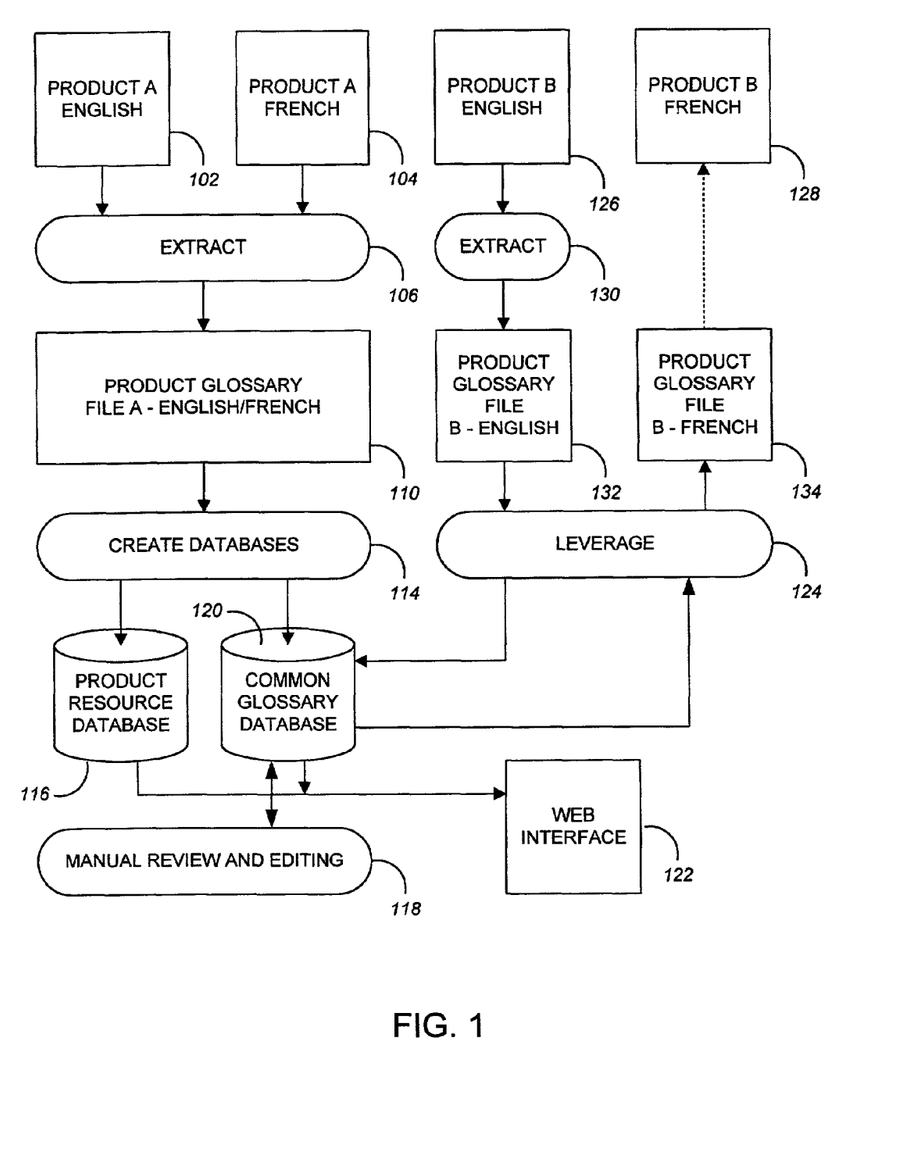
FIG. 1 is a functional block diagram of a process for localizing products.

As shown in FIG. 1, two localizations exist for a product ("Product A"). One localization 102 of Product A ("Product A English") has a user interface in the English language. Another localization 104 of Product A ("Product A French") has a user interface in the French language. An extract process 106 extracts user interface strings from localizations 102 and 104, and writes the strings to a product glossary file 110 ("Product Glossary File A—English/French"). A user interface string is any item in the user interface of a product, including prompts, font names, text in dialog boxes and the like.

In one implementation, the user interface strings are extracted from product resource files associated with each product. A product resource file is a file that contains a description of the user interface elements for the product. The user interface elements can be described by type, such as dialog boxes, buttons and menus, referred to as resource type. User interface items within a resource type, such as a user interface string, can be identified by a resource ID.

As part of the process, each string within product glossary file 110 is associated with a unique identifier that identifies context information about a previous use of the string, such as location in a user interface, product name and product version. Corresponding strings in different localizations of a product will have the same unique identifier and are translations of each other. For example, the string "color" in the "Object" menu in the English localization corresponds to the string "couleur" in the "Objet" menu in the French localization, and accordingly the strings "color" and "couleur" will have the same unique identifier, which will be referred to as a "set identifier" because it identifies a set of corresponding strings.

In one implementation a set identifier is represented as a record in a relational database table having fields as shown in Table 1 below.

TABLE 1

| Field | Description |
|---|---|
| prodContext_product | Identifies the product that contains the user interface string, including the product family, name, version, platform and build number. |
| prodContext_componentId | Identifies the component that contains the user interface string within the product. |
| prodContext_sourceFile | Identifies the source file that contains the user interface string within the component. |
| prodContext_resourceType | Identifies the resource type that contains the user interface string within the source file. |
| prodContext_resourceId | Identifies the resource ID for the user interface string within the resource type. |

Figure 2:
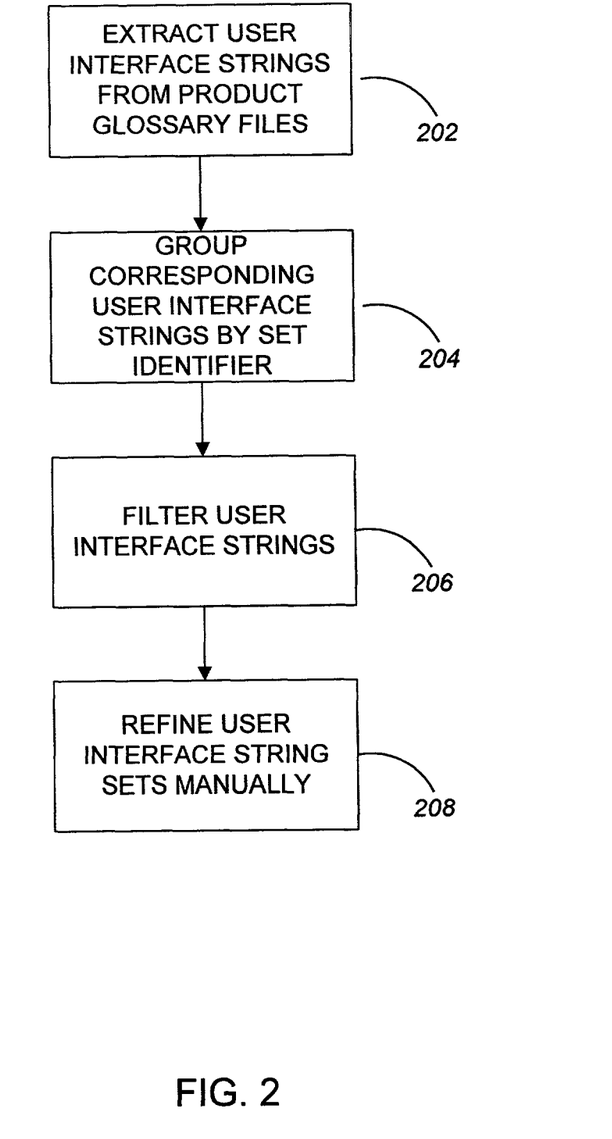
FIG. 2 depicts a process for creating a product resource database.

A create database process imports the user interface strings and their set identifiers into a product resource database 116. As shown in FIG. 2, create product resource database process extracts user interface strings and their set identifiers from product glossary file 110 (step 202). Corresponding strings are grouped into sets using their set identifiers (step 204). A copy of the user interface strings and their set identifiers is imported into product resource database 116. In one implementation, product resource database 116 stores the user interface strings in Unicode, thereby allowing the storage and processing of strings in multiple human languages within a single database.

If the user interface strings in product resource database 116 meet certain predefined criteria, then the user interface strings and their set identifiers are imported into common glossary database 120 (step 206). For example, only those user interface strings of a certain specified type and having no more than a maximum specified number of words might be imported into common glossary database 120. The number of words in a string might be defined as a criterion because shorter strings tend to be shared across products. Examples of string types include strings used in menus, buttons and dialog boxes. Only those user interface strings meeting the predefined criteria will be imported into common glossary database 120.

In one implementation, the common glossary database 120 can be refined manually (step 208). The common glossary database 120 can be exported to a manual review and editing process 118, which can include having people review the sets of corresponding user interface strings for technical and linguistic accuracy and make any needed changes. The refined strings are then imported back into the common glossary database 120, which then contains an approved set of translations for use by automatic and manual processes. The common glossary database 120 can store the user interface strings in Unicode, thereby allowing the storage and processing of strings in multiple human languages within a single database.

Manual and automatic processes can access the product resource database 116 and the common glossary database 120 through a web interface 122. A leverage process 124 can create a localization of a product based on another localization of that product using the common glossary database 120 as described in detail by example below.

The leverage process 124 will be described with reference to creating a product glossary file 134 ("Product Glossary File B—French") for a French localization 128 ("Product B French") using an English localization 126 ("Product B English") and the common glossary database 120. Before the leverage process 124 begins, an extract process 130 extracts user interface strings from English localization 126 and writes the strings to a product glossary file 132 ("Product Glossary File B—English") and a set identifier is created for each user interface string in the product glossary file 132, which identifies the user interface string's context.

By way of explanation, assume that the common glossary database 120 contains the entries shown in Tables 2 and 3.

TABLE 2

| String | Set Identifier | | |
|---|---|---|---|
| color | Product: | Name | Photoshop |
| | | Version | 6.0 |
| | | Platform | Windows |
| | Component ID: | AcquireExport/GIF89Export | |
| | Source File Name: | gif89exp.rc | |
| | Resource Type: | dialog | |
| | Resource ID: | IDD_COLOR | |

TABLE 3

| String | Set Identifier | | |
|---|---|---|---|
| couleur | Product: | Name | Photoshop |
| | | Version | 6.0 |
| | | Platform | Windows |
| | Component ID: | AcquireExport/GIF89Export | |
| | Source File Name: | gif89exp.rc | |
| | Resource Type: | dialog | |
| | Resource ID: | IDD_COLOR | |

The entries shown in Tables 2 and 3 belong to a set of corresponding user interface strings because they are associated with the same set identifier. The English language string in the set is "color." The French language string in the set is "couleur."

Figure 3:
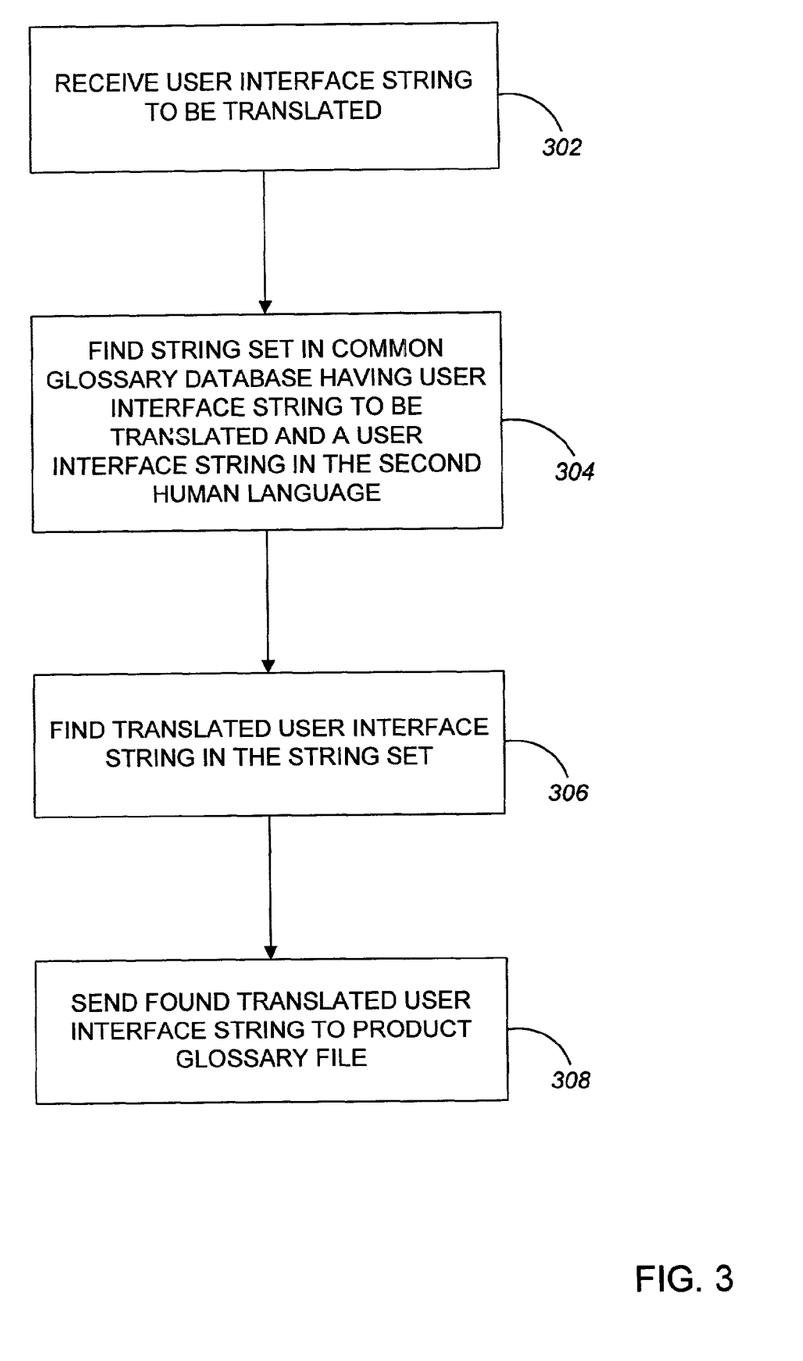
FIG. 3 depicts a process for leveraging a common glossary database to localize a product.

As shown in FIG. 3, the leverage process 124 receives a user interface string to be translated (step 302). In this example, the user interface string is an English language string received from product glossary file 132. Assume the received user interface string is the word "color." The leverage process opens the common glossary database 120 to find a string set having the received user interface string and a user interface string in the French language (step 304). The leverage process can also look for matching user interface strings within product resource database 116 in a similar manner. A string set having the received user interface string can be found by searching for matching literal content of the user interface string, set identifier of the user interface string, or both.

If multiple matching user interface strings are found by matching the literal string values, then the context information of each matching user interface string is compared to the context information of the received user interface string. Comparing the context information can be done by comparing the set identifiers. In one implementation, a score is generated for each matching user interface string, and the string with the highest score is chosen as the matching user interface string. A score is a measurement of the degree of similarity between the context information and is generated by comparing context information about a previous use of the found user interface strings to context information about a previous use of the received user interface string. A score can also measure other criteria in addition to the degree of similarity between the context information. By way of explanation, assume that the received user interface string is the entry shown in column 2 of Table 4 and the common glossary database 120 and product resource database 116 contain the entries shown in columns 3-5 of Table 4.

TABLE 4

| Item | Received User Interface String | User Interface String #1 | User Interface String #2 | User Interface String #3 |
|---|---|---|---|---|
| String | color | color | color | color |
| Product | photoshop | photoshop | photoshop | acrobat |
| Version | 6.0 | 5.0 | 6.0 | 5.0 |
| Platform | windows | windows | windows | windows |
| Component ID | AcquireExport/ GIF89Export | AcquireExport/ GIF89Export | AcquireExport/ GIF89Export | AcquireExport/ Movie |
| Source File Name | gif89exp.rc | gif89exp.rc | gif89exp.rc | movie32.rc |
| Resource Type | menu | menu | dialog | menu |
| ResourceID | IDD_FONTCOLOR | IDD_FONTCOLOR | IDD_COLOR | IDD_COLOR |

Scores for the found user interface strings can be generated using the scoring system shown in Table 5 below.

TABLE 5

| Item | Score | User Interface String #1 | User Interface String #2 | User Interface String #3 |
|---|---|---|---|---|
| Entry found in common glossary database | 16 | yes | yes | no |
| Product name matches | 8 | yes | yes | no |
| Version number matches | 4 | no | yes | no |
| Platform number matches | 2 | yes | yes | yes |
| Component ID matches | 0 | yes | yes | no |
| Source file name matches | 0 | yes | yes | no |
| Resource type matches | 1 | yes | no | yes |
| Resource ID matches | 0 | yes | no | no |
| SCORE | 31 max. | 27 (16 + 8 + 2 + 1 = 27) | 30 (16 + 8 + 4 + 2 = 30) | 3 (2 + 1 = 3) |

In this example, the leverage process searched both common glossary database 120 and product resource database 116. Common glossary database 120 contains manually reviewed and edited strings, while product resource database 116 contains strings that have not been manually reviewed and edited. A higher score is given to the user interface strings that were found in the common glossary database 120. This is an example of a score measuring other criteria in addition to the degree of similarity between the context information. In this example, User Interface String #2 has the highest score and would therefore be chosen as the matching user interface string.

In another implementation, the string with the highest score and having a score that equals or exceeds a specified minimum score value is chosen as the matching user interface string. If no such user interface string exists, then no matching user interface string is chosen. In the above example, if the minimum score value was specified as 31, then no matching user interface string would have been chosen.

If a single match is found, then a score for the found user interface string is generated and if the score equals or exceeds a specified minimum score value, if any, then it is chosen as the matching user interface string. If the score is less than the specified minimum score value, then no matching user interface string is chosen.

Once a matching user interface string is chosen from the common glossary database 120 the set identifier associated with the matching user interface string is known and the string set is found. The leverage process then finds the French language string in the string set (step 306). In this example, User Interface String #2 was chosen, which is the glossary database entry shown in Table 2. The French language string in the string set is "couleur", shown in Table 3, because it has the same set identifier. The leverage process then sends the found translated string to French product glossary file 134 (step 308). This process is repeated for each user interface string in product glossary file 132.

If no matching user interface string is chosen from the common glossary database 120, then the leverage process sends, in this example, the English language string to the French product glossary file 134, for later manual translation.

In an alternative implementation, the initial state of product glossary file 134, rather than being empty as described above, is a copy of product glossary file 132. In this implementation, as translated strings are found the leverage process replaces the English language strings in product glossary file 134 with the translated strings in the French language. User interface strings in product glossary file 134 for which the leverage process did not find a translation remain in the English language and require later manual translation.

Figure 4:
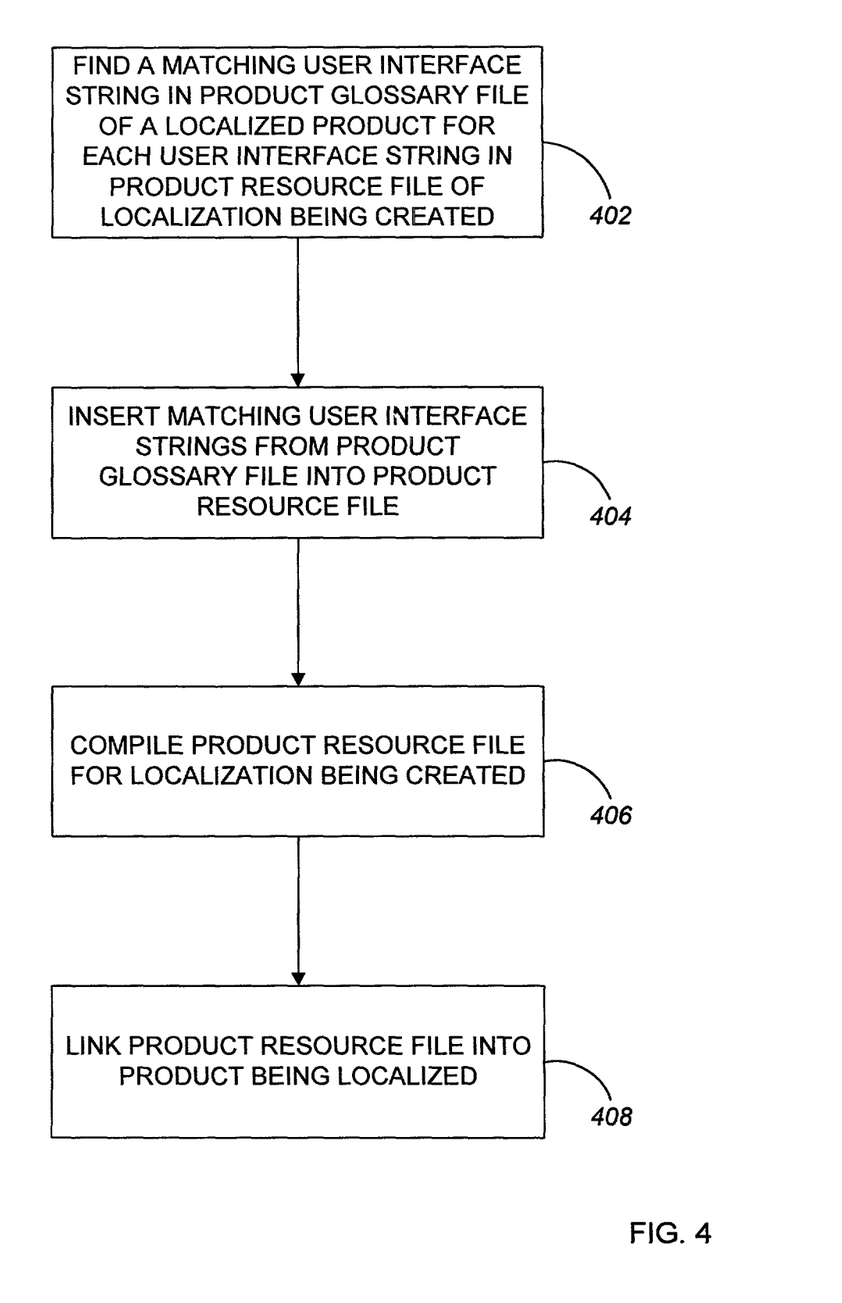
FIG. 4 depicts a process for localizing a product.

Product glossary file 134 is used to localize Product B as localization 128. In one implementation, the localization process is a prior art process that runs as follows. Each user interface string described in a product resource file for a localized product is matched to a user interface string in a product glossary file for the localization to be created (step 402). The user interface string in a product resource file can be matched to a user interface string in a product glossary file by the resource ID of the user interface string, which resource ID identifies the user interface string in the product resource file and which can be included in the context information contained in the user interface string's set identifier in the product glossary file. For example, the process finds a matching resource ID in both localization 126 and product glossary file 134. The user interface string in product glossary file 134 that is associated with the resource ID is inserted into the product resource file for the product being localized (step 404). For example, if the resource ID in product glossary file 134 is associated with the user interface string "couleur", then "couleur" is inserted into the resource file for localization 128. When this process is completed, the product resource file for the product being localized is compiled, if necessary (step 406). The product resource file for the product being localized is then linked into the product being localized (step 408). For example, the product resource file for localization 128 is linked into localization 128.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of embodiments of the invention have been described. Other embodiments are within the scope of the following claims. For example, the invention can be implemented without using a conventional independent database. Further, it is possible to manipulate data directly rather than through a product glossary file.

What is claimed is:

1. A computer implemented method for creating a glossary database, the method comprising:
   extracting, using a processor, a plurality of user interface strings in at least a first and a second human language from at least one software product having a user interface for at least the first human language and the second human language, where each user interface string is a string displayed in a user interface of the software product;
   creating a set identifier for each user interface string, wherein the set identifier for a user interface string comprises context information about a use of the user interface string in a user interface of the software product including a name of the software product and an identifier specifying a type of user interface string;
   grouping user interface strings in the first human language and the second human language having the same set identifier into string sets;
   generating the glossary database comprising the user interface strings in at least the first and second human languages grouped into string sets by the set identifiers;
   searching for one or more literal user interface strings in the glossary database that matches a selected user interface string;
   generating a score for each matching user interface string based on a comparison of (i) context information about a previous use of the matching user interface string with (ii) context information about a previous use of the selected user interface string; and
   deciding, based on the score and using a processor, whether or not to select a string set.

2. The method of claim 1, further comprising:
   excluding user interface strings that are not of a specified type or that exceed a specified maximum number of words.

3. The method of claim 1, further comprising:
   refining the string sets manually.

4. The method of claim 1, wherein the context information further includes at least one of the following:
   component ID;
   source file name; or
   resource type.

5. The method of claim 1, wherein the context information includes at least one of the following:
   product version;
   product language;
   platform; or
   build number.

6. The method of claim 1, wherein the plurality of user interface strings are extracted from at least two products.

7. The method of claim 1, wherein the user interface strings in the glossary database are stored in Unicode.

8. The method of claim 1, wherein deciding whether or not to select a string set comprises:
   determining whether multiple matching user interface strings are found or a single matching user interface string is found;
   upon determining that multiple matching user interface strings are found,
      selecting a string set that includes the matching user interface string having the highest score and having a score that equals or exceeds a specified minimum score value, and if no string set includes such a matching user interface string, then delegating a translation of the selected user interface string from the first human language into the second human language to a human translator, and
   upon determining that a single matching user interface string is found,
      selecting a string set that includes the single matching user interface string if the score for the matching user interface string equals or exceeds a specified minimum score value, else, delegating a translation of the user interface string from the first human language into the second human language to a human translator.

9. A computer implemented method for generating a second human language user interface for a software product having a first human language user interface, the method comprising:
   opening a glossary database that includes a plurality of string sets at least some of which include a user interface string in a first human language and a corresponding user interface string in a second human language, wherein a string set comprises user interface strings having the same set identifier, a set identifier comprising context information about a previous use of a user interface string in a user interface of a software product including a name of the software product and an identifier specifying a type of user interface string and each user interface string comprises a string displayed in a user interface of a software product;
   selecting a user interface string in the first human language user interface;

finding, using a processor, a string set in the glossary database having the selected user interface string and a user interface string in the second human language, wherein the user interface strings in the string set were previously used in a software product different from the software product for which the second human language user interface is being generated; and using the user interface string in the second human language in the second human language user interface, wherein finding a string set in the glossary database having the selected user interface string comprises:

searching for one or more literal user interface strings in the glossary database that matches the selected user interface string, and generating a score for each matching user interface string based on a comparison of (i) context information about a previous use of the matching user interface string with (ii) context information about a previous use of the selected user interface string, and deciding, based on the score, whether or not to select a string set including a matching interface string.

10. The method of claim 9, wherein if multiple matches are found, selecting a string set that includes the matching user interface string having the highest score and having a score that equals or exceeds a specified minimum score value and if no string set includes such a user interface string, then not selecting a string set and delegating to a human translator the translation of the user interface string in the first human language into the second human language.

11. The method of claim 9, wherein if a single match is found, selecting a string set that includes the matching user interface string if the score for the corresponding matching user string equals or exceeds a specified minimum score value and if the score for the corresponding matching user string is less than the specified minimum score value, then not selecting the string set and delegating to a human translator the translation of the user interface string in the first human language into the second human language.

12. The method of claim 9, further comprising:

placing the user interface string in the second human language into a location in the user interface in the second human language corresponding to a location of the user interface string in the user interface in the first human language.

13. The method of claim 9, wherein the glossary database comprises user interface strings extracted from at least two products.

14. The method of claim 9, wherein user interface strings in the glossary database are stored in Unicode.

15. A computer-readable storage device encoded with a computer program product for use in creating a glossary database, the product comprising instructions operable to cause data processing apparatus to perform operations comprising:

extracting a plurality of user interface strings in at least a first human language and a second human language from at least one software product having a user interface for at least the first human language and the second human language, where each user interface string is a string displayed in a user interface of the software product;

creating a set identifier for each user interface string, wherein the set identifier for a user interface string comprises context information about a use of the user interface string in a user interface of the software product including a name of the software product and an identifier specifying a type of user interface string;

grouping user interface strings in the first human language and the second human language having the same set identifier into string sets;

generating the glossary database comprising the user interface strings in at least the first and second human languages grouped into string sets by the set identifiers, searching for one or more literal user interface strings in the glossary database that matches a selected user interface string;

generating a score for each matching user interface string based on a comparison of (i) context information about a previous use of the matching user interface string with (ii) context information about a previous use of the selected user interface string; and deciding, based on the score, whether or not to select a string set.

16. The product encoded on the computer-readable storage device of claim 15, further operable to cause a data processing apparatus to perform operations comprising:

exclude user interface strings that are not of a specified type or that exceed a specified maximum number of words.

17. The product encoded on the computer-readable storage device of claim 15, wherein the context information includes at least one of the following:

component ID;

source file name; or resource type.

18. The product encoded on the computer-readable storage device of claim 15, wherein the context information includes at least one of the following:

product version;

product language;

platform; or build number.

19. The product encoded on the computer-readable storage device of claim 15, wherein the plurality of user interface strings are extracted from at least two products.

20. The product encoded on the computer-readable storage device of claim 15, wherein the user interface strings in the glossary database are stored in Unicode.

21. The computer readable storage device of claim 15, further operable to cause a data processing apparatus to perform operations comprising:

determining whether multiple matching user interface strings are found or a single matching user interface string is found;

upon determining that multiple matching user interface strings are found, selecting a string set that includes the matching user interface string having the highest score and having a score that equals or exceeds a specified minimum score value, and if no string set includes such a matching user interface string, then delegating a translation of the selected user interface string from the first human language into the second human language to a human translator, and upon determining that a single matching user interface string is found, selecting a string set that includes the single matching user interface string if the score for the corresponding matching user interface string equals or exceeds a specified minimum score value, else, delegating a translation of the user interface string from the first human language into the second human language to a human translator.

22. A system for use in creating a glossary database, the system comprising:
  means for extracting a plurality of user interface strings in at least a first human language and a second human language from at least one software product having a user interface for at least the first human language and the second human language, where each user interface string is a string displayed in a user interface of the software product;
  means for creating a set identifier for each user interface string, wherein a set identifier for a user interface string comprises context information about a use of the user interface string in a user interface of the software product including a name of the software product and an identifier specifying a type of user interface string;
  means for grouping user interface strings in the first human language and the second human language having the same set identifier into string sets;
  means for generating the glossary database comprising the user interface strings in at least the first and second human languages grouped into string sets by the set identifiers;
  means for searching for one or more literal user interface strings in the glossary database that matches a selected user interface string;
  means for generating a score for each matching user interface string based on a comparison of (i) context information about a previous use of the matching user interface string with (ii) context information about a previous use of the selected user interface string; and
  means for deciding, based on the score, whether or not to select a string set.

23. The system of claim 22, further comprising:
  means for excluding user interface strings that are not of a specified type or that exceed a specified maximum number of words.

24. The system of claim 22, wherein the context information includes at least one of the following:
  component ID;
  source file name; or
  resource type.

25. The system of claim 22, wherein the context information includes at least one of the following:
  product version;
  product language;
  platform; or
  build number.

26. The system of claim 22, wherein the plurality of user interface strings are extracted from at least two products.

27. The system of claim 22, wherein the user interface strings in the glossary database are stored in Unicode.

28. The system of claim 22, further comprising:
  means for selecting, upon detecting multiple matching user interface strings, a string set that includes the matching user interface string having the highest score and having a score that equals or exceeds a specified minimum score value, and means for delegating, upon detecting that no string set includes such a matching user interface string, a translation of the selected user interface string from the first human language into the second human language to a human translator; and
  means for selecting, upon detecting a single matching user interface string, a string set that includes the single matching user interface string if the score for the matching user interface string equals or exceeds a specified minimum score value, and means for delegating, if the score for the matching user interface string is less than the specified minimum score value, a translation of the user interface string from the first human language into the second human language to a human translator.

29. A computer-readable storage device encoded with a computer program product for use in generating a second human language user interface for a software product having a first human language user interface, the product comprising instructions operable to cause data processing apparatus to perform operations comprising:
  opening a glossary database that includes a plurality of string sets at least some of which include a user interface string in a first human language and a corresponding user interface string in a second human language, wherein a string set comprises user interface strings having the same set identifier, a set identifier comprising context information about a previous use of a user interface string in a user interface of a software product including a name of the software product and an identifier specifying a type of user interface string and each user interface string comprises a string displayed in a user interface of a software product;
  selecting a user interface string in the first human language user interface;
  finding, using a processor, a string set in the glossary database having the selected user interface string and a user interface string in the second human language, wherein the user interface strings in the string set were previously used in a software product different from the software product for which the second human language user interface is being generated; and
  using the user interface string in the second human language in the second human language user interface,
  wherein finding a string set in the glossary database having the selected user interface string comprises:
    searching for one or more literal user interface strings in the glossary database that matches the selected user interface string,
    generating a score for each matching user interface string based on a comparison of (i) context information about a previous use of the matching user interface string with (ii) context information about a previous use of the selected user interface string, and
    deciding, based on the score, whether or not to select a string set.

30. The product encoded on the computer-readable storage device of claim 29, wherein,
  if multiple matches are found,
  selecting a string set that includes the matching user interface string having the highest score and having a score that equals or exceeds a specified minimum score value and if no string set includes such a user interface string, then not selecting a string set and delegating to a human translator the translation of the user interface string in the first human language into the second human language.

31. The product encoded on the computer-readable storage device of claim 29, wherein
  if a single match is found,
  selecting a string set that includes the matching user interface string if the score for the matching user interface string equals or exceeds a specified minimum score value and if the score for the matching user interface string is less than the specified minimum score value, then not selecting the string set and delegating to a human translator the translation of the user interface string in the first human language into the second human language.

32. The product encoded on the computer-readable storage device of claim 29, wherein finding a string set in the glossary database having the selected user interface string comprises:
   placing the user interface string in the second human language into a location in the user interface in the second human language corresponding to a location of the user interface string in the user interface in the first human language.

33. The product encoded on the computer-readable storage device of claim 29, wherein the glossary database comprises user interface strings extracted from at least two products.

34. The product encoded on the computer-readable storage device of claim 29, wherein user interface strings in the glossary database are stored in Unicode.

35. A system for use in generating a second human language user interface for a software product having a first human language user interface, the system comprising:
   means for opening a glossary database that includes a plurality of string sets at least some of which include a user interface string in a first human language and a corresponding user interface string in a second human language, wherein a string set comprises user interface strings having the same set identifier, a set identifier comprising context information about a previous use of a user interface string in a user interface of a software product including a name of the software product and an identifier specifying a type of user interface string and each user interface string comprises a string displayed in a user interface of a software product;
   means for selecting a user interface string in the first human language user interface;
   means for finding a string set in the glossary database having the selected user interface string and a user interface string in the second human language, wherein the user interface strings in the string set were previously used in a software product different from the software product for which the second human language user interface is being generated; and
   means for using the user interface string in the second human language in the second human language user interface;
   wherein the means for finding a string set in the glossary database having the selected user interface string comprise:
      means for searching for one or more literal user interface strings in the glossary database that matches a selected user interface string,
      means for generating a score for each matching user interface string based on a comparison of (i) context information about a previous use of the matching user interface string with (ii) context information about a previous use of the selected user interface string, and
      means for deciding, based on the score, whether or not to select a string set.

36. The system of claim 35, comprising
   if multiple matches are found,
   means for selecting a string set that includes the matching user interface string having the highest score and having a score that equals or exceeds a specified minimum score value and if no string set includes such a user interface string, then not selecting a string set and delegating to a human translator the translation of the user interface string in the first human language into the second human language.

37. The system of claim 35, comprising
   if a single match is found,
   means for selecting a string set that includes the matching user interface string if the score for the corresponding matching user string equals or exceeds a specified minimum score value and if the score for the corresponding matching user string is less than the specified minimum score value, then not selecting the string set and delegating to a human translator the translation of the user interface string in the first human language into the second human language.

38. The system of claim 35, further comprising:
   means for placing the user interface string in the second human language into a location in the user interface in the second human language corresponding to a location of the user interface string in the user interface in the first human language.

39. The system of claim 35, wherein the glossary database comprises user interface strings extracted from at least two products.

40. The system of claim 35, wherein user interface strings in the glossary database are stored in Unicode.

\* \* \* \* \*